US012567790B2

(12) United States Patent
    Okazaki et al.

(10) Patent No.: US 12,567,790 B2
(45) Date of Patent: Mar. 3, 2026

(54) MAGNETIC FLUX MODULATED TYPE MAGNETIC GEAR

(71) Applicant: Mitsubishi Electric Corporation, Tokyo (JP)

(72) Inventors: Kodai Okazaki, Tokyo (JP); Junji Kitao, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 137 days.

(21) Appl. No.: 18/273,975

(22) PCT Filed: Mar. 12, 2021

(86) PCT No.: PCT/JP2021/009984
§ 371 (c)(1),
(2) Date: Jul. 25, 2023

(87) PCT Pub. No.: WO2022/190340
PCT Pub. Date: Sep. 15, 2022

(65) Prior Publication Data
US 2024/0429805 A1       Dec. 26, 2024

(51) Int. Cl.
*H02K 49/10*          (2006.01)
(52) U.S. Cl.
CPC ................................. *H02K 49/102* (2013.01)
(58) Field of Classification Search
CPC ..................................................... H02K 49/102
USPC ........................................................... 310/104
See application file for complete search history.

(56) References Cited

U.S. PATENT DOCUMENTS

| 2012/0021674 A1* | 1/2012 | Schroeter .............. B24B 31/003 |
| | | 451/28 |
| 2012/0274168 A1* | 11/2012 | Holzner ................. H02K 1/246 |
| | | 310/156.53 |
| 2013/0002087 A1* | 1/2013 | Allen ........................ H02K 1/16 |
| | | 29/596 |
| 2013/0119789 A1* | 5/2013 | Maekawa .............. H02K 21/12 |
| | | 310/46 |
| 2013/0320795 A1 | 12/2013 | Enomoto et al. |

(Continued)

FOREIGN PATENT DOCUMENTS

| EP | 3118972 A1 | 1/2017 |
| JP | 2013-059178 A | 3/2013 |

(Continued)

OTHER PUBLICATIONS

Tojima et al, English Machine Translation of WO 2015137392 (Year: 2015).*

(Continued)

*Primary Examiner* — Rashad H Johnson
(74) *Attorney, Agent, or Firm* — XSENSUS LLP

(57)          ABSTRACT
A magnetic flux modulated type magnetic gear includes a small number of poles mechanism which has a plurality of magnetic poles, a large number of poles mechanism which has more magnetic poles than the small number of poles mechanism, and a pole piece which is provided between the small number of poles mechanism and the large number of poles mechanism, wherein, in the magnetic pole of the large number of poles mechanism, a permanent magnet and a magnetic field coil are provided. And the magnetic field coil is connected to a direct current power supply, which can be turned on and off.

19 Claims, 7 Drawing Sheets

(56)                    References Cited

U.S. PATENT DOCUMENTS

| | | | |
|---|---|---|---|
| 2018/0034356 A1 | 2/2018 | Urch | |
| 2018/0115180 A1* | 4/2018 | Shin | H02K 1/14 |
| 2020/0187310 A1* | 6/2020 | Seiwald | H05B 6/108 |
| 2024/0429805 A1* | 12/2024 | Okazaki | H02K 7/088 |

FOREIGN PATENT DOCUMENTS

| | | |
|---|---|---|
| JP | 2017-175904 A | 9/2017 |
| JP | 2018-507680 A | 3/2018 |
| WO | 2012/114368 A1 | 8/2012 |
| WO | 2015/137392 A1 | 9/2015 |

OTHER PUBLICATIONS

International Search Report and Written Opinion mailed on Apr. 6, 2021, received for PCT Application PCT/JP2021/009984, filed on Mar. 12, 2021, 9 pages including English Translation.

* cited by examiner

MAGNETIC FLUX MODULATED TYPE MAGNETIC GEAR

CROSS-REFERENCE TO RELATED APPLICATION

The present application is based on PCT filing PCT/JP2021/009984, filed Mar. 12, 2021, the entire contents of which are incorporated herein by reference.

TECHNICAL FIELD

The present disclosure relates to a magnetic flux modulated type magnetic gear.

BACKGROUND ART

A typical magnetic gear is in the configuration where the teeth of a mechanical gear are simply replaced with permanent magnets. For that reason, the magnetic gear is capable of accelerating and decelerating in a no-contact manner, and makes small vibrations and noises, and further, its maintainability can be expected to be improved. However, in the transmission of torque with permanent magnets, the torque is smaller than that of the mechanical gear, because only magnets which face each other contribute to torque transmission. On the other hand, in order to increase the torque, a magnetic flux modulated type magnetic gear is adopted, where the amount of magnetic flux which contributes to the torque transmission is increased within a structure. Therein, a large number of poles mechanism and a small number of poles mechanism are constructed, which have been arranged so that the polarities of adjoining permanent magnets may become mutually reversed ones. The large number of poles mechanism and the small number of poles mechanism face each other with a magnetic gap in-between. In addition, two or more pole elements, each called a pole piece, which are arranged at an equal interval in a circumference direction, are constructed in the magnetic gap.

While the magnetic flux modulated type magnetic gear can improve the transmission torque, eddy current loss and hysteresis loss are generated due to the large amount of magnetic flux which passes through the inside of a structure by way of a magnetic gap part, and heat generation and decreased efficiency are caused. In particular, a great volume of magnetic flux passes in the permanent magnets which are arranged near the magnetic gap part, and furthermore, the fluctuation of magnetic flux over time is large. Eddy current loss is then likely to be generated, and this becomes a key factor to decrease the efficiency. Then, in order to reduce the eddy current which occurs inside of a magnet, and to transmit torque efficiently, a structure is proposed in the Patent Document 1 for reducing the eddy current loss which is a key factor of decreased efficiency, where permanent magnets which constitute a small number of poles mechanism and a large number of poles mechanism are embedded to the inside of magnetic materials, and thereby, the permanent magnets are kept away from the magnetic flux fluctuations near the magnetic gap part, and furthermore, the permanent magnets are formed in a division structure.

CITATION LIST

Patent Literature

Patent Document 1: WO 2012/114368

SUMMARY OF THE INVENTION

Technical Problem

However, when a permanent magnet is embedded in a magnetic material, the permanent magnet will be kept away from a magnetic gap part, and then, the amount of effective magnetic flux which contributes to torque transmission will decrease. Moreover, since the division of permanent magnets will produce gaps on the inside structure, there remains the subject that the absolute quantity of magnetic flux tends to decrease. Moreover, when a permanent magnet is embedded in a magnetic material, while the eddy current loss may be reduced, efficiency becomes deteriorated when the magnetic gear is driven at a high velocity revolution, because the eddy current loss is proportional to the square of the frequency of magnetic flux fluctuations. Thereby, there remains the subject that the deterioration characteristic does not change even in the Patent Document 1.

In particular, when a magnetic flux modulated type magnetic gear is used as the magnetic flux modulated type magnetic gear in a vehicle driving system, highly efficient characteristics are called for under various speed conditions and torque conditions. In that case, since a high velocity revolution of 10,000 r/min or more is assumed also as a condition, there arises a problem that the use of a magnetic gear becomes a factor to decrease the total efficiency of a driving system, and the application of the magnetic gear is difficult to attain.

The present application is made, in order to solve the mentioned above subjects. The present application aims at offering a magnetic flux modulated type magnetic gear with a high degree of efficiency, which, on various speed conditions and torque conditions, can achieve a drive state with small losses, while securing a required transmission torque.

Solution to Problem

A magnetic flux modulated type magnetic gear, according to the present application, includes:

a small number of poles mechanism which has a plurality of magnetic poles, a large number of poles mechanism which has more magnetic poles than the small number of poles mechanism, and a pole piece which is provided between the small number of poles mechanism and the large number of poles mechanism, wherein a permanent magnet and a magnetic field coil are provided in the magnetic pole of the large number of poles mechanism, and the magnetic field coil is connected to a direct current power supply, which can be turned on and off.

Advantageous Effects of the Invention

According to the present application, a permanent magnet and a magnetic field coil are provided, in the magnetic pole of a large number of poles mechanism of a magnetic flux modulated type magnetic gear. Then, the present application can offer a magnetic flux modulated type magnetic gear with a high degree of efficiency, which can achieves, on various speed conditions and torque conditions, a drive state with small losses, while securing a required transmission torque.

DESCRIPTION OF EMBODIMENTS

Embodiment 1

Figure 1:
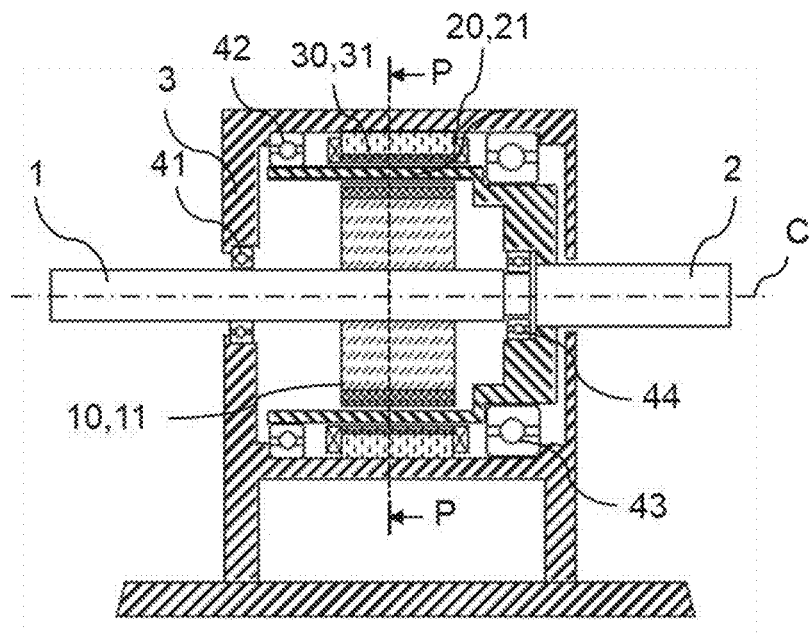
FIG. 1 is a sectional view showing the magnetic flux modulated type magnetic gear according to the Embodiment 1.

FIG. 1 shows a sectional view of the magnetic flux modulated type magnetic gear according to the Embodiment 1. An input axis 1 is connected with and fixed with a small number of poles mechanism 10, and an output axis 2 is connected with and fixed with a pole piece 20. The rotary power of the input axis is decelerated to the output axis 2 at a predetermined gear ratio, and will be output with an increased torque. The small number of poles mechanism 10 and the pole piece 20 correspond to a first rotor 11 and a second rotor 21, respectively. Moreover, the large number of poles mechanism 30 constitutes a stator 31, and the stator is connected to a frame 3 which is fixed on the outside. The small number of poles mechanism 10 connected to the input axis 1 and the pole piece 20 connected to the output axis are stored in the frame 3, so as to rotate freely by way of bearings 41, 42, 43, and 44. Moreover, the input axis 1, the output axis 2, the small number of poles mechanism 10, and the pole piece 20 each have a rotation center C, which becomes the same center with the large number of poles mechanism 30.

Figure 2:
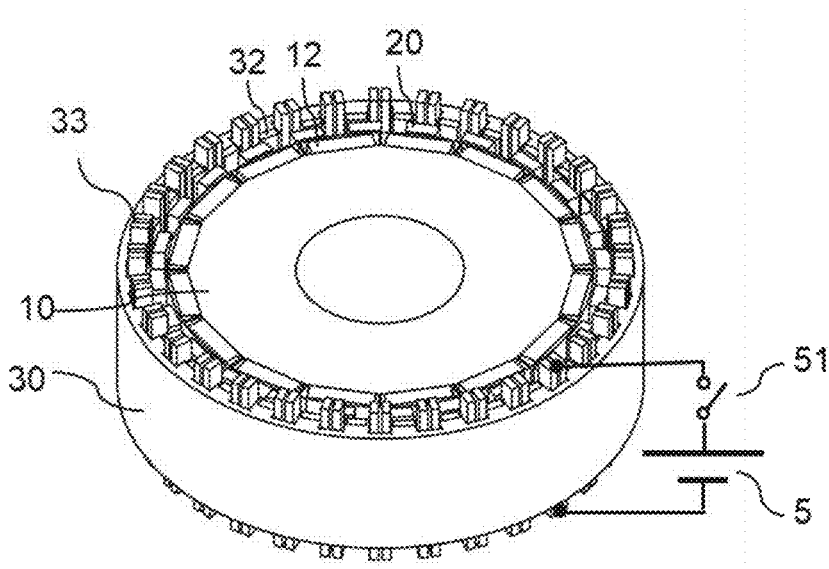
FIG. 2 is a perspective view showing the magnetic pole structure of the magnetic flux modulated type magnetic gear according to the Embodiment 1.

FIG. 2 is a perspective view showing the magnetic pole structure of the magnetic flux modulated type magnetic gear in the Embodiment 1. This view is the one in which magnetic pole constituting portions of the small number of poles mechanism 10, the pole piece 20, and the large number of poles mechanism 30 are cut out. The large number of poles mechanism 30 has thirty-two permanent magnets 32, and magnetic field coils 33 for generating magnetic field flux. All the magnetic field coils 33 are connected together by way of a direct current power supply 5 and a switch 51. The switch 51 is provided so as to be turned on and off, during the operation of the magnetic flux modulated type magnetic gear. In addition, the switch can change the states of the magnetic field coils 33 between the application of currents and the non-application of currents. Moreover, the small number of poles mechanism 10 has sixteen permanent magnets 12, and the pole piece 20 consists of twenty-four pole elements which are provided between the small number of poles mechanism 10 and the large number of poles mechanism 30. That is, the gear ratio of the magnetic gear according to the present Embodiment is $24/(16/2)=3$. The rotary power of the input axis 1 is decelerated to $\frac{1}{3}$ time, and at the same time, increased in torque to 3 times, which is output to the output axis 2.

Figure 3:
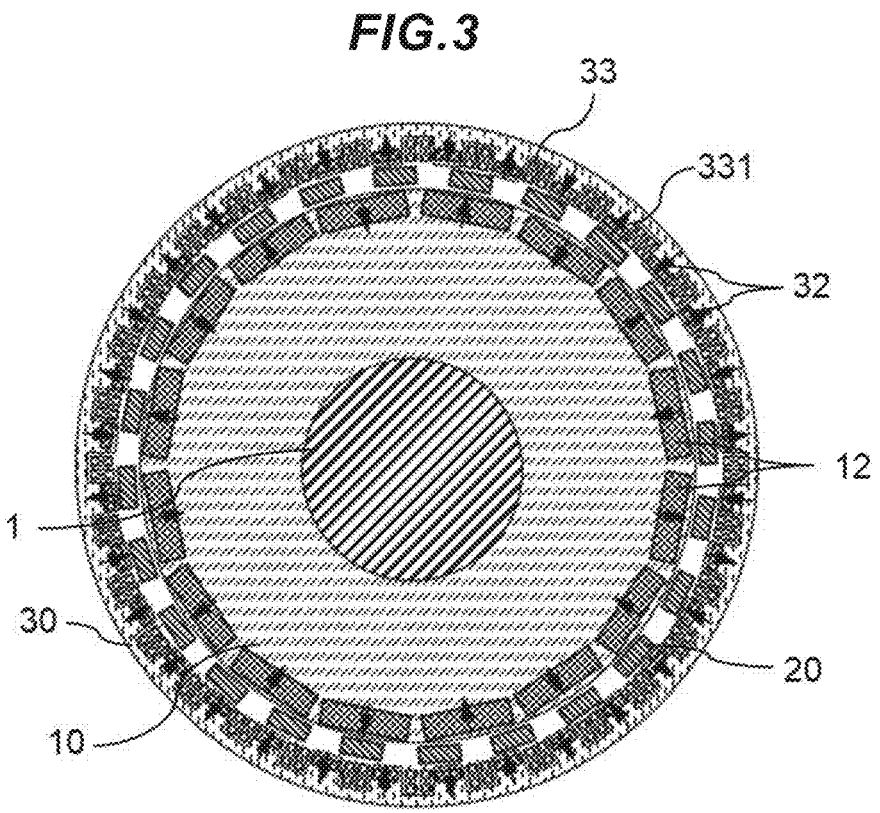
FIG. 3 is a sectional view showing the magnetic pole structure of the magnetic flux modulated type magnetic gear according to the Embodiment 1.

FIG. 3 is a transverse cross section view of the magnetic flux modulated type magnetic gear according to the Embodiment 1. FIG. 3 shows a cross section view, taken along the line P-P of FIG. 1. The large number of poles mechanism 30 has teeth parts 331, which are each projected toward a magnetic gap face. A permanent magnet 32 is embedded in a magnet insertion hole part, which is provided in the tip portion of a teeth part 331, at the magnetic gap face side. As indicated by arrows in FIG. 3, those permanent magnets 32, which are each arranged at a teeth part 331, are magnetized alternatively, so that the teeth part 331 which adjoins in the circumference direction may have the magnetic pole of a counter direction. Each of the teeth parts is wound around with a coil, to form a magnetic field coil 33. Each coil of the magnetic field coil 33 is wire connected with the direct current power supply 5, so that its magnetization direction may be in agreement with that of the permanent magnet 32 of the teeth part 331, at the time when current is applied. As indicated by arrows in FIG. 3, like those of the large number of poles mechanism 30, the permanent magnets 12 of the small number of poles mechanism 10 are also magnetized alternatively, so that the magnetic pole which adjoins in the circumference direction may have the magnetic pole of a counter direction.

Figure 4:
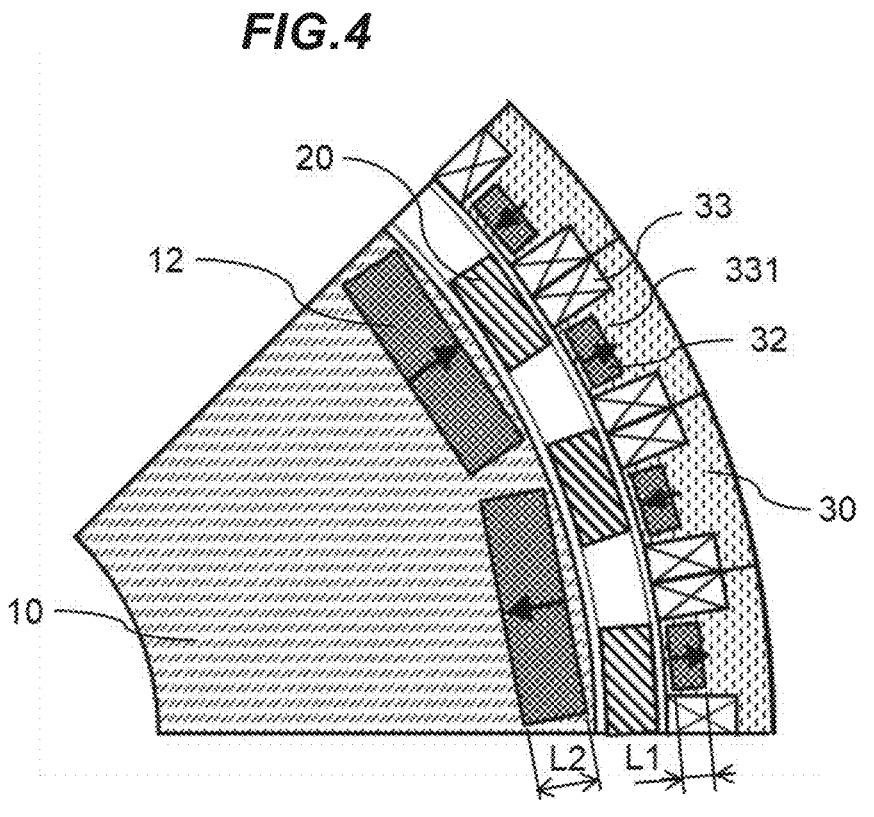
FIG. 4 is an enlarged cross section view showing the magnetic pole structure of the magnetic flux modulated type magnetic gear according to the Embodiment 1.

FIG. 4 is an enlarged illustration of the transverse cross section view of the magnetic flux modulated type magnetic gear according to the Embodiment 1. The magnetization direction thickness of a permanent magnet 32 in the large number of poles mechanism 30 (in the present Embodiment, the magnetization direction is a radial direction) is set to be L1, and the magnetization direction thickness of a permanent magnet 12 in the small number of poles mechanism 10 is set to be L2. When the two thicknesses satisfy the relation L1<L2, it becomes possible to reduce magnet eddy losses which occur in the permanent magnets 12 and 32.

Figure 5A:
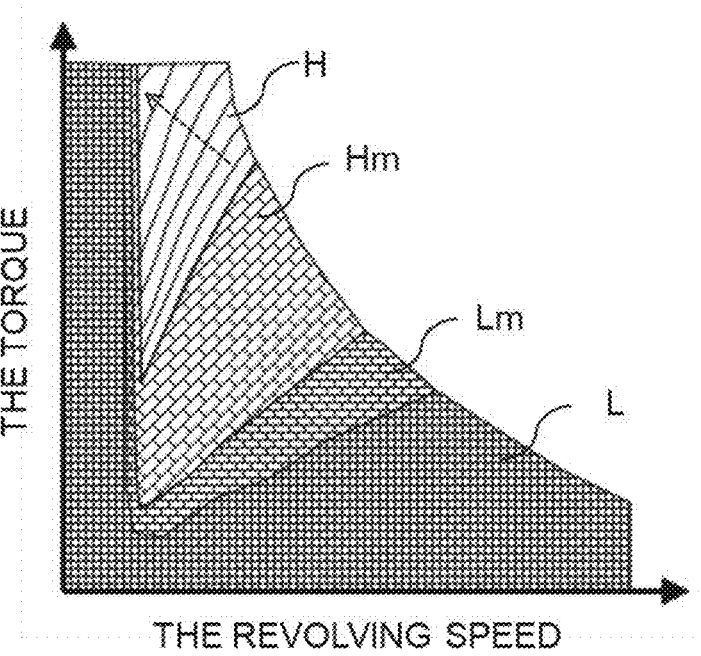
FIG. 5A is a first diagram showing the characteristics between the revolving speed and the torque of the magnetic flux modulated type magnetic gear according to the Embodiment 1.
Figure 5B:
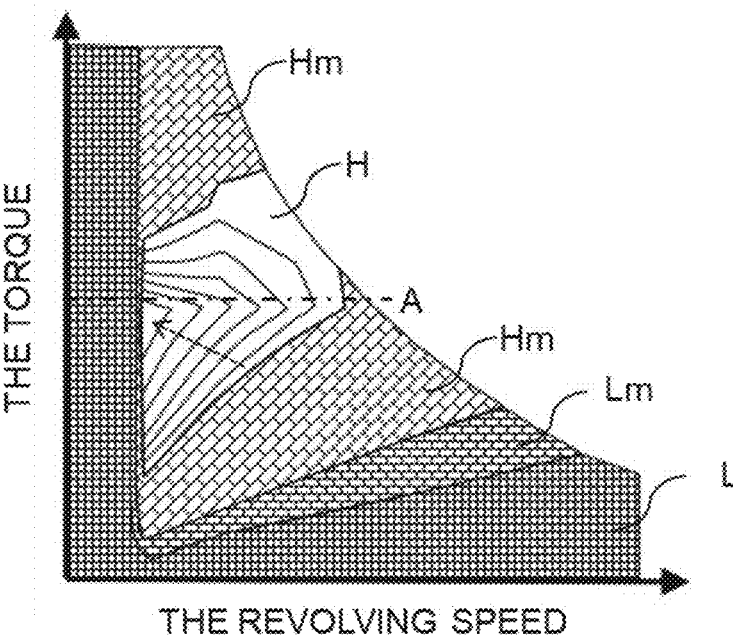
FIG. 5B is a second diagram showing the characteristics between the revolving speed and the torque of the magnetic flux modulated type magnetic gear according to the Embodiment 1.

FIG. 5A and FIG. 5B are diagrams showing the characteristics between the revolving speed and the torque of a magnetic flux modulated type magnetic gear according to the Embodiment 1. Here, the revolving speed and the torque both denote the rotary power which is input into the input axis 1. The characteristic of a structure known in the art is shown in FIG. 5A, and the characteristic of the present application structure is shown in FIG. 5B, where the same maximum transmission torque is generated. The structure known in the art is in a state where there is no magnetic field coil 33 which is used in the present disclosure. In addition, the structure known in the art holds conditions equivalent to a state where the switch 51 of the direct current power supply 5, for the magnetic field coils 33 of the present application, is turned off. In FIG. 5A and FIG. 5B, the diagrams are each divided into four domains, from a low domain to a high domain, according to the efficiency of a magnetic gear. In addition, from the lowest one in the efficiency, those domains are denoted as low in efficiency L, middle low in efficiency Lm, middle high in efficiency Hm, and high in efficiency H. Moreover, in the domain of high in efficiency H, contour lines are used to show the domain of high efficiency. The dashed line arrow in the drawing shows that efficiency is higher to the arrow direction.

In FIG. 5A showing the characteristic of the structure known in the art, the operation domain which becomes the high in efficiency H is limited to a low speed and high torque domain. On the other hand, in FIG. 5B showing the present application at the time when current is applied to, it is shown that the operation domain which becomes the high in efficiency H moves from the low torque domain to the middle torque domain, and the efficiency in a high speed domain is also improved. The structure known in the art is the same as the structure of the present application which is in no current applying state. Then, it becomes possible to use the magnetic gear at a high efficiency, from the revolving speed low domain to the high domain, whereby current application from the direct current power supply 5 to each of the magnetic field coils 33 is carried out, only at a restrictive drive condition where a large torque is needed, and as for other usual drive conditions, that is, at a low to middle torque domain, no current is applied.

Moreover, in a condition where a large torque is required, the magnetic gear can be used in a current applying state, which is shown in FIG. 5B. Then, at no current applying time under the usual drive conditions, the magnetic gear can employ the structure in which the amount of permanent magnets is smaller than that of the structure known in the art, so that the permanent magnet may produce the amount of magnetic flux which can generate necessary minimum transmission torque (level A, which is shown with the one-point chain line of FIG. 5B). By doing so, magnetic flux induced losses, including the eddy current loss in a permanent magnet can be reduced, and the efficiency at a high velocity revolution time can be improved.

It is worth noticing that, at a current applying time, copper loss occurs in the coil part of a magnetic field coil 33. Then, the efficiency in the high torque region tends to become lower than that of the structure known in the art. The drive condition by the application of current is however restrictive, and in the vehicle driving system, the operating conditions from at the low torque domain to at the middle torque domain are dominant. Thus, the copper loss at a current applying time will not become a major problem.

Figure 6:
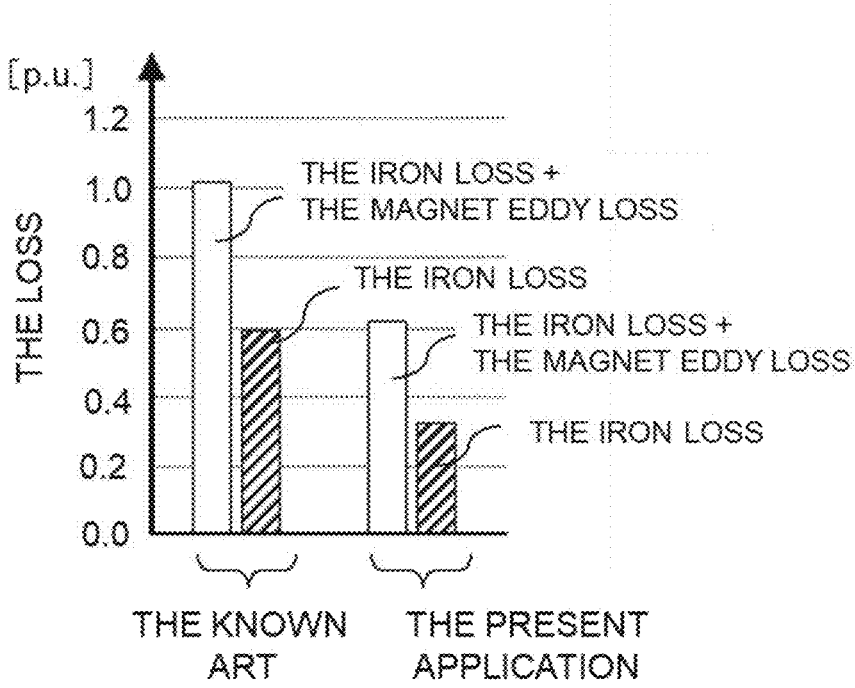
FIG. 6 is a drawing showing the losses of the magnetic flux modulated type magnetic gear according to the Embodiment 1.

FIG. 6 is a drawing showing the effects in efficiency improvement, on a certain fixed revolving speed and torque condition, regarding the magnetic flux modulated type magnetic gear according to the Embodiment 1. In a magnetic flux modulated type magnetic gear, iron loss and magnet eddy loss are dominant efficiency deterioration factors. The drawing shows compared analysis results where iron loss and magnet eddy loss are taken into consideration. Here, the iron loss is the sum of an eddy current loss and a hysteresis loss which occur in a magnetic material part, and the magnet eddy loss is an eddy current loss which occurs in a permanent magnet part. It is confirmed that, in the case of iron loss only, an effect in the loss reduction is about 50%, and in the case of iron loss including magnet eddy loss, an effect in the loss reduction is about 40%. This analysis shows that the area of iron can be reduced by the same amount or more of the axial direction cross section area of the magnetic field coil 33, and further, the iron loss is reduced, whereby the teeth part 331 is constructed and the magnetic field coil 33 is arranged in the large number of poles mechanism 30, where iron loss and magnet eddy loss are likely to increase due to the passage of high frequency components. Moreover, the analysis also shows that, since a smaller permanent magnet is used, compared with the structure known in the art which can generate the same maximum transmission torque, the magnet eddy loss is reduced.

It is worth noticing that, in order to further improve the efficiency, a desirable structure is that the permanent magnet 32 of the large number of poles mechanism 30 has a smaller magnetization direction thickness and the teeth part 331 has a wider core part. Generally, as shown also in the Patent Document 1, the magnet eddy loss of the large number of poles mechanism 30 is larger than that of the small number of poles mechanism 10, and becomes a main efficiency deterioration factor. Then, as shown in FIG. 4, the configuration is employed in which the permanent magnet 32 of the large number of poles mechanism 30 is thinner than the permanent magnet 12 of the small number of poles mechanism 10, and the relation L1<L2 is satisfied. Thereby, reducing effect in the magnet eddy loss will be improved.

Moreover, since the magnetic flux modulated type magnetic gear of the structure known in the art requires a large number of permanent magnets, there is a concern that manufacturing costs will soar. Cost reduction can be however achieved by commonly using the permanent magnets which are used in the small number of poles mechanism 10 and the large number of poles mechanism 30. For example, the permanent magnet 12 of the small number of poles mechanism 10 is divided into two or more elements, per one magnetic pole, in the magnetization direction and the magnetization orthogonal direction. In addition, a magnet insert hole whose size is enough to allow the insertion of a divided magnet is provided in the teeth part 331 of the large number of poles mechanism, and one magnetic pole of the large number of poles mechanism 30 is constituted from a smaller number of permanent magnets, than that of one magnetic pole of the small number of poles mechanism 10. Thereby, manufacturing cost can be reduced.

Furthermore, the magnetic field coil 33 of direct current application is provided in the teeth part 331 which is equipped with a permanent magnet 32 at the tip part. Thereby, in a magnetic circuit, a structure is established where the magnetomotive force sources are arranged in series. Moreover, the position where the magnetic field coil 33 is wound around is in agreement with the position where the permanent magnet 32 is arranged. Thus, the magnetization of the permanent magnet 32 in the large number of poles mechanism 30 is enhanced by the application of direct current to the magnetic field coil 33. Thereby, while the permanent magnet 32 is reduced in the magnetization direction thickness, a synergistic effect to improve demagnetization resistance can be obtained.

Moreover, as shown in FIG. 3, the large number of poles mechanism 30 which has magnetic field coils 33 is arranged as a stator 31, which is at the outside diameter side and rotation fixed. This arrangement simplifies the composition of a cooling mechanism, and further, a larger slot area can be taken between teeth parts, compared with the case where a magnetic field coil is arranged in the first rotor 11, located at the inside diameter side. In addition, more magnetic field coils 33 can be wound around, and the torque improvement effect at the current applying time and the reducing effect on the amount of heat generation are acquired. Moreover, wire connection of the coils of direct current application is easy to handle on the stator 31, and this is advantageous in the manufacturing.

Moreover, because the present disclosure, unlike an electric motor, does not have an armature which always receives the application of alternative current at a drive time, a slot between teeth parts, as a whole, can be used as a space of the magnetic field coil 33 of direct current application. Furthermore, the direct current application is for enhancing temporarily the magnetization of the permanent magnet 32 in the large number of poles mechanism 30, and its power is much smaller than the electric power required for the drive of an electric motor. Then, the amount of heat generation can be kept low, compared with an electric motor. It is worth noticing that, in the Embodiment 1, an example is shown in which the permanent magnet 32 is embedded in a magnet insert hole part provided in the teeth part 331 of the large number of poles mechanism 30. The same effect will be however acquired also in the case where the permanent magnet 32 is pasted on the magnetic gap side tip part of the teeth part 331.

Embodiment 2

Figures 7, 8:
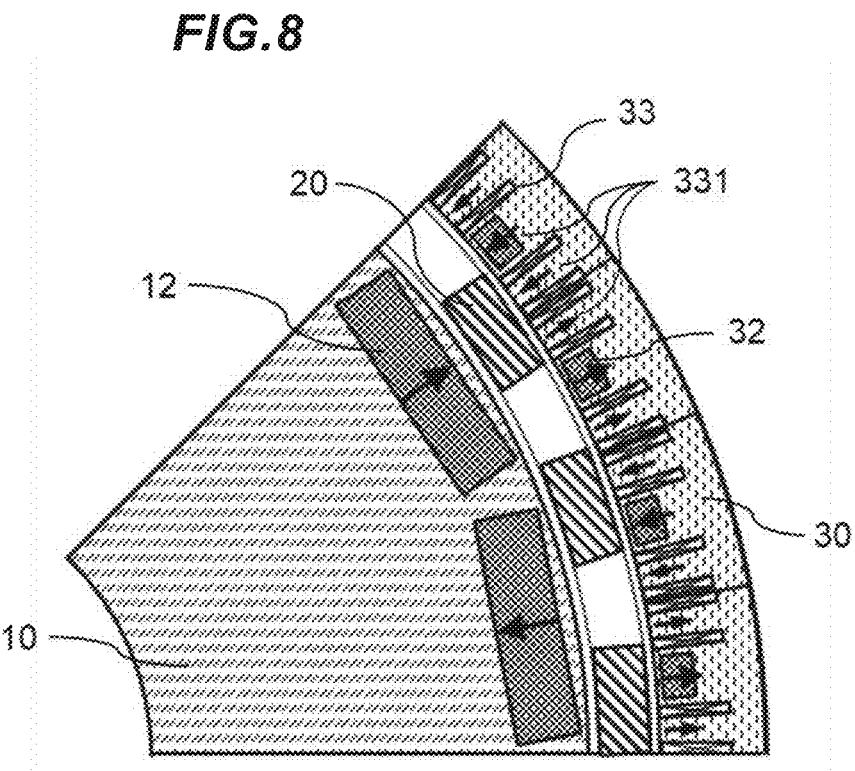
FIG. 7 is an enlarged cross section view showing the magnetic pole structure of the magnetic flux modulated type magnetic gear according to the Embodiment 2.
FIG. 8 is an enlarged cross section view showing the magnetic pole structure of the magnetic flux modulated type magnetic gear according to the Embodiment 3.

FIG. 7 is an enlarged illustration of the transverse cross section view of the magnetic flux modulated type magnetic gear according to the Embodiment 2. A teeth part 331 which is arranged with a permanent magnet 32, and a teeth part 331 which is wound around with a magnetic field coil are different. In addition, the polarities of permanent magnets 32 which are each arranged at a teeth part 331 are in the same direction, and the magnetic field coil 33 is applied with current, so as to have a polarity in the opposite direction to the permanent magnet 32. Other configurations are the same as those of the Embodiment 1.

Focusing on the large number of poles mechanism 30, it is found that the present configuration has a stator structure of a consequent type motor, in which N pole is an iron core, while S pole is a permanent magnet 32. According to the present configuration, the slot area between the teeth parts can be expanded, and the dimensions of the permanent magnet in the large number of poles mechanism can be expanded, and the degree of design freedom can be improved.

It is worth noticing that, in the Embodiment 2, an example is shown in which the permanent magnet 32 is embedded in a magnet insert hole part, which is provided in the teeth part 331 of the large number of poles mechanism 30. The same effect will be however acquired also in the case where the permanent magnet 32 is pasted on the magnetic gap side tip part of the teeth part 331.

Embodiment 3

FIG. 8 is an enlarged illustration of the transverse cross section view of the magnetic flux modulated type magnetic gear according to the Embodiment 3. Each magnetic pole of the large number of poles mechanism 30 consists of three teeth parts 331. In the one on the center among them, a permanent magnet 32 is arranged, and in each of the two adjoining ones at both neighbors, a magnetic field coil 33 is wound around. When direct current is applied to the two magnetic field coils 33 which each constitute one magnetic pole, magnetomotive force is enhanced on the basis of magnetization of the permanent magnet 32 which is arranged at the teeth part 331 on the center.

That is, a teeth part 331 which is arranged with a permanent magnet 32, and a teeth part 331 which is wound around with a magnetic field coil 33 are different. Moreover, the polarities of permanent magnets 32 of the teeth parts, which are each arranged with a permanent magnet 32, are reversed for each teeth part. When current is applied, the teeth parts which are each provided with a magnetic field coil 33 are magnetized, so that magnetomotive forces of the magnetic poles may become the same in direction and intensity. Other configurations are the same as those of the Embodiment 1. Also in the present configuration, the same effect as in the Embodiment 1 will be acquired.

Figure 9:
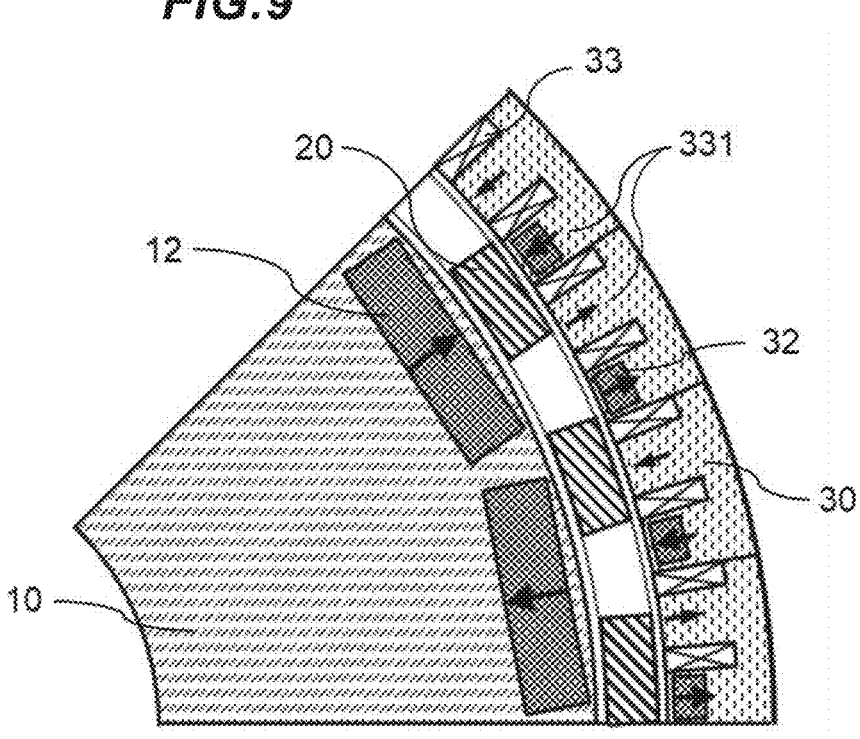
FIG. 9 is an enlarged cross section view showing the magnetic pole structure of the magnetic flux modulated type magnetic gear according to the Embodiment 3.

FIG. 9 is an enlarged illustration of the transverse cross section view of the magnetic flux modulated type magnetic gear according to the modified example of the Embodiment 3. Each magnetic pole of the large number of poles mechanism 30 consists of two teeth parts 331. In one of the two teeth parts 331, a permanent magnet 32 is arranged, and, in the other of the two teeth parts 331, a magnetic field coil 33 is wound around. When direct current is applied to the magnetic field coil 33, magnetomotive force is enhanced on the basis of magnetization of the permanent magnet 32 which is arranged at the adjoining teeth part 331. Other configurations are the same as those of the Embodiment 3 which is shown in FIG. 8. While the waveform of the magnetomotive force in the large number of poles mechanism 30 becomes asymmetric depending on the rotation direction, the slot area between the teeth parts 331 can be however expanded. Then, the degree of design freedom in the magnetic field coil 33 can be improved.

It is worth noticing that, in the Embodiment 3, an example is shown in which the permanent magnet 32 is embedded in a magnet insert hole part which is provided in the teeth part 331 of the large number of poles mechanism 30. The same effect will be however acquired also in the case where a permanent magnet is pasted on the magnetic gap side tip part of the teeth part 331.

Moreover, in the present Embodiment, an example is shown where the teeth part 331 which is arranged with the permanent magnet 32 is one in number, per one magnetic pole of the large number of poles mechanism 30, and the teeth part 331 which is wound around with the magnetic field coil 33 is one or two in number. Even if the number of teeth parts 331 which are each arranged with a permanent magnet 32, and the number of teeth parts 331 which are each wound around with a magnetic field coil 33 are any numbers, the same effect will be acquired, as long as magnetic poles in the large number of poles mechanism 30 are arranged so as to reverse in the circumference direction to achieve a magnetic deceleration gear.

Embodiment 4

Figure 10:
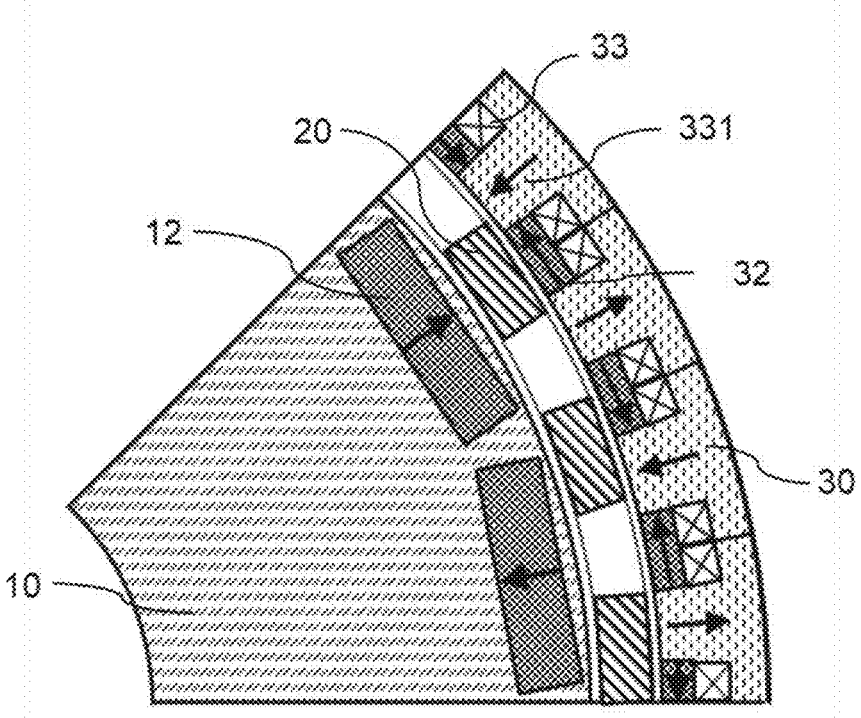
FIG. 10 is an enlarged cross section view showing the magnetic pole structure of the magnetic flux modulated type magnetic gear according to the Embodiment 4.

FIG. 10 is an enlarged illustration of the transverse cross section view of the magnetic flux modulated type magnetic gear according to the Embodiment 4. A permanent magnet 32 which is magnetized in the circumference direction is arranged in the circumference direction and between tip parts of the adjoining teeth parts 331. In addition, all the teeth parts 331 are wound around with magnetic field coils 33. The direction of direct current application to the magnetic field coil 33 and the magnetization direction of the permanent magnet 32 are configured, so that adjoining teeth parts 331 may have different magnetic poles. Moreover, the magnetization directions of permanent magnets 32 are arranged so as to face each other in the circumference direction. Other configurations are the same as those of the Embodiment 1.

The present configuration indicates a hybrid magnetic field structure, guiding the magnetic flux of the permanent magnet 32, which directs to a magnetic gap part, at the coil current applying time. According to the present configuration, the difference between the amount of magnetic flux at no current applying time and the amount of magnetic flux at a current applying time can be increased. Then, since a large amount of variable magnetic flux can be obtained, the degree of design freedom in the large number of poles mechanism 30 can be improved.

Figure 11:
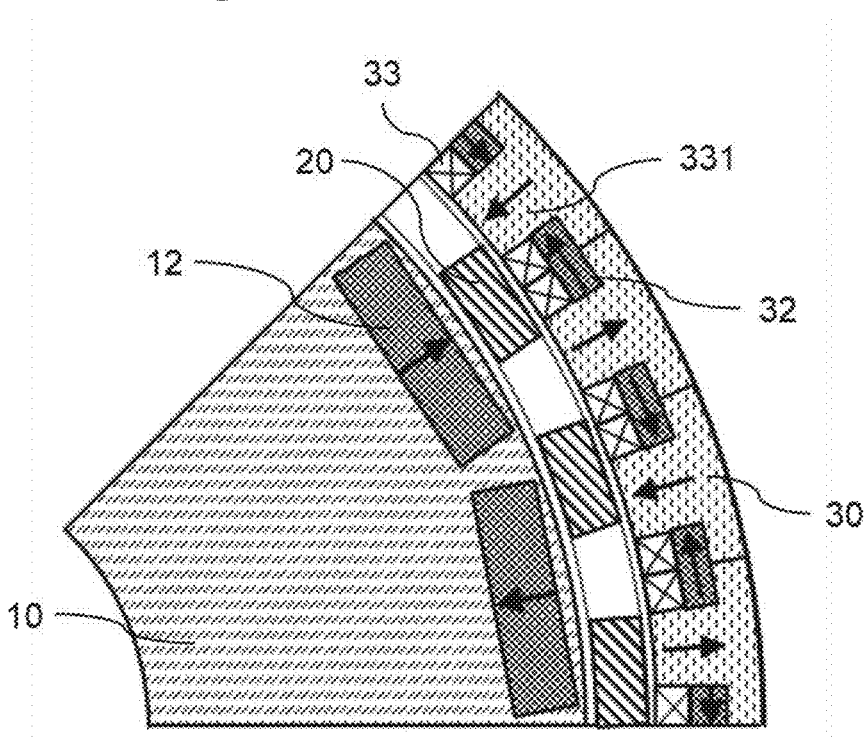
FIG. 11 is an enlarged cross section view showing the magnetic pole structure of the magnetic flux modulated type magnetic gear according to the Embodiment 4.

FIG. 11 is an enlarged illustration of the transverse cross section view of the magnetic flux modulated type magnetic gear according to the modified example of the Embodiment 4. A permanent magnet 32 which is magnetized in the circumference direction is arranged in the circumference direction and between the root parts of adjoining teeth parts 331. Other configurations are the same as those of the Embodiment 4 which is shown in FIG. 10. The permanent magnet 32 is configured to be kept away from a magnetic gap part, and further reduction in the magnet eddy loss can be achieved.

It is worth noticing that, in the Embodiment 4, a case is shown where the permanent magnet which is magnetized in the circumference direction is arranged at the tip part of the teeth part 331, or at the root part of the teeth part 331. The same effect will be however acquired in the case where the permanent magnet is arranged at the middle of, from the tip part to the root part. Moreover, also when the permanent magnet 32 is embedded at a yoke part side which becomes an outer edge of the large number of poles mechanism 30, or independent divided teeth parts 331 are connected each other, where the permanent magnet 32 becomes a yoke part, the same effect will be acquired.

In another Embodiment, the permanent magnet 32 is composed of variable magnet materials, such as SmCo (Samarium-Cobalt magnet) system material, which are adjustable in the amount of generated magnetic flux. When current is applied to the magnetic field coil 33, it becomes possible to adjust the amount of generated magnetic flux. Other configurations are the same as those of the Embodiment 1. According to those configurations, the amount of variable magnetic flux can be further expanded, and the degree of design freedom can be further improved.

Moreover, in the aforementioned Embodiments, an example of a speed down gear is shown, where speed down and increased torque are carried out. The same effect will be however acquired also in the configuration of a speed up gear, where the input axis 1 and the output axis 2 are reversed in the configuration, and speed up and decreased torque are carried out.

Moreover, in the aforementioned Embodiments, an example is shown where the large number of poles mechanism 30 is the stator 31, the small number of poles mechanism 10 is the first rotor 11, and the pole piece 20 is the second rotor 21. In some embodiments, the large number of poles mechanism 30 may be set as a third rotor. Further, the same effect will be however acquired also in the case where the small number of poles mechanism 10 or the pole piece 20 is set as a stator.

Moreover, in the aforementioned Embodiments, an example is shown where the permanent magnets 12 and 32 in both magnetic poles are each made from a simple substance. The same effect will be however acquired in the case where a permanent magnet is divided in the magnetization direction, the magnetization orthogonal direction and the axis direction, and other directions.

Moreover, in the aforementioned Embodiments, an example of a radial type is shown where a magnetic gap part is provided in the radial direction which intersects perpendicularly to the rotation center C. The same effect will be however acquired also in the case of an axial type where a magnetic gap part is provided in the axis direction parallel to the rotation center C. That is, the same effect will be acquired even in the case where magnetic gaps are each provided in the axis direction, between the small number of poles mechanism 10 and the polepiece 20, and also between the pole piece 20 and the large number of poles mechanism 30.

Moreover, in all the aforementioned Embodiments, an example is shown where the small number of poles mechanism 10 is provided with sixteen poles, the large number of poles mechanism 30 is provided with thirty-two poles, and the pole piece 20 is provided with twenty-four pole elements. The same effect will be however acquired in the case where the pole number of the small number of poles mechanism 10 is smaller than the pole number of the large number of poles mechanism 30, and at the same time, the combination to constitute a magnetic gear is formed, in other words, $(2m-1)$ $Np=N2\pm(2n-1)$ $N1$, where the pole pair number of the small number of poles mechanism 10 is N1, the pole pair number of the large number of poles mechanism 30 is N2, and the number of pole elements is Np (m and n are both natural numbers).

Moreover, in the aforementioned Embodiments, a case is shown where the teeth part 331, the pole piece 20, and the permanent magnets 12 and 32 are all in the simplest form. However, if the pole assignment of the magnetic gap part has the same relationship as that of the aforementioned Embodiments, the same effect will be acquired, regardless of the shapes of the teeth part 331, the pole piece 20, and the permanent magnets 12 and 32. For example, those situations include: a case where the teeth part 331 and the pole piece 20 are in the shape of spreading in the radial direction toward a magnetic gap part, like folding fans, or in the shape of a skirt with a narrow hem; a case where bond magnets are used for the permanent magnets 12 and 32; and a case where two or more permanent magnets are used per one magnetic pole, and those magnets are embedded in the V shape.

Although the present application is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations to one or more of the embodiments. It is therefore understood that numerous modifications which have not been exemplified can be devised without departing from the scope of the present application. For example, at least one of the constituent components may be modified, added, or eliminated. At least one of the constituent components mentioned in at least one of the preferred embodiments may be selected and combined with the constituent components mentioned in another preferred embodiment.

REFERENCE SIGNS LIST

1 Input Axis: 2 Output Axis: 3 Frame: 10 Small Number of Poles Mechanism: 11 First Rotor: 12 Permanent Magnet: 20 Pole Piece: 21 Second Rotor: 30 Large Number of Poles Mechanism: 31 Stator: 32 Permanent Magnet: 33 Magnetic Field Coil: 331 Teeth Part: 41, 42, 43 and 44 Bearing: 5 Direct Current Power Supply: 51 Switch.

What is claimed is:

1. A magnetic flux modulated type magnetic gear, comprising:

a small number of poles mechanism which has a plurality of magnetic poles, a large number of poles mechanism which has more magnetic poles than the small number of poles mechanism, and a pole piece which is provided between the small number of poles mechanism and the large number of poles mechanism, wherein a permanent magnet and a magnetic field coil are provided in one of the magnetic poles of the large number of poles mechanism, the magnetic field coil is connected to a direct current power supply via a switch, and the direct current power supply is configured to be turned on and off during operation of the magnetic flux modulated type magnetic gear.

2. The magnetic flux modulated type magnetic gear, as claimed in claim 1, wherein the small number of poles mechanism, the large number of poles mechanism, and the pole piece each have a rotation center to become the same center, and any one of the small number of poles mechanism, the large number of poles mechanism, and the pole piece is connected to an input axis, and another one is connected to an output axis.

3. The magnetic flux modulated type magnetic gear as claimed in claim 1, wherein a magnetization direction thickness of a permanent magnet which is provided in one of the magnetic poles of the small number of poles mechanism is larger than a magnetization direction thickness of the permanent magnet which is provided in the large number of poles mechanism.

4. The magnetic flux modulated type magnetic gear, as claimed in claim 1, wherein the large number of poles mechanism is a stator which is rotation fixed.

5. The magnetic flux modulated type magnetic gear, as claimed in claim 1, wherein the large number of poles mechanism has a teeth part which is projected toward a magnetic gap face.

6. The magnetic flux modulated type magnetic gear, as claimed in claim 1, wherein the permanent magnet is arranged at a tip of a teeth part which is provided in the large number of poles mechanism.

7. The magnetic flux modulated type magnetic gear, as claimed in claim 1, wherein the permanent magnet is embedded in a teeth part which is provided in the large number of poles mechanism.

8. The magnetic flux modulated type magnetic gear, as claimed in claim 1, wherein the permanent magnet and the magnetic field coil are provided in a teeth part which is provided in the large number of poles mechanism.

9. The magnetic flux modulated type magnetic gear, as claimed in claim 1, wherein the large number of poles mechanism is provided with first teeth parts which are each arranged with the permanent magnet, and second teeth parts which are each wound around with the magnetic field coil, first magnetization directions of the first teeth parts which are each provided with the permanent magnet are in the same direction, toward a magnetic gap face, and second magnetization directions of the second teeth parts which are each provided with the magnetic field coil are in the opposite direction of the first magnetization directions of the first teeth parts which are each provided with the permanent magnet, toward the magnetic gap face.

10. The magnetic flux modulated type magnetic gear, as claimed in claim 1, wherein the large number of poles mechanism is provided with first teeth parts which are each arranged with the permanent magnet, and second teeth parts which are each wound around with the magnetic field coil, magnetization directions of the first teeth parts which are each provided with the permanent magnet are reversed for each first teeth part, toward a magnetic gap face, and the second teeth parts which are each provided with the magnetic field coil are magnetized, so that magnetomotive forces of the magnetic poles may become the same in direction and intensity.

11. The magnetic flux modulated type magnetic gear, as claimed in claim 1, wherein the permanent magnet is arranged between adjoining teeth parts and magnetized in a circumference direction.

12. The magnetic flux modulated type magnetic gear, as claimed in claim 1, wherein the permanent magnet is composed of a variable magnet material, which is adjustable in an amount of generated magnetic flux when current is applied to the magnetic field coil.

13. The magnetic flux modulated type magnetic gear, as claimed in claim 1, wherein the small number of poles mechanism is arranged at an inside diameter side, and the large number of poles mechanism is arranged at an outside diameter side.

14. The magnetic flux modulated type magnetic gear, as claimed in claim 1, wherein a magnetic gap is provided, in an axis direction, between the small number of poles mechanism and the pole piece, and also between the pole piece and the large number of poles mechanism.

15. The magnetic flux modulated type magnetic gear as claimed in claim 1, wherein the direct current power supply and the switch are configured to:

apply a direct current to the magnetic field coil when a drive condition requires a larger torque than a torque generatable by the permanent magnet alone, and not apply the direct current to the magnetic field coil during when a drive condition does not require the larger torque.

16. The magnetic flux modulated type magnetic gear as claimed in claim 1, wherein a magnetization direction thickness of the permanent magnet in the large number of poles mechanism is less than a magnetization direction thickness of a permanent magnet in the small number of poles mechanism.

17. The magnetic flux modulated type magnetic gear as claimed in claim 1, wherein the permanent magnet in the large number of poles mechanism is composed of a variable magnet material such that an amount of magnetic flux generated by the permanent magnet is adjustable when a direct current is applied to the magnetic field coil by the direct current power supply and the switch.

18. The magnetic flux modulated type magnetic gear as claimed in claim 1, wherein the permanent magnet in the large number of poles mechanism is configured to produce a necessary minimum transmission torque when no direct current is applied to the magnetic field coil by the direct current power supply and the switch, and wherein application of the direct current to the magnetic field coil by the direct current power supply and the switch increases the transmission torque above the necessary minimum transmission torque.

19. The magnetic flux modulated type magnetic gear as claimed in claim 1, wherein the large number of poles mechanism comprises a plurality of teeth parts each projected toward a magnetic gap face, and for at least one of the teeth parts:

the permanent magnet is arranged at a tip portion of the at least one teeth part at a magnetic gap face side, or is embedded in a magnet insertion hole provided in the tip portion of the at least one teeth part at the magnetic gap face side, and the at least one teeth part is wound around with the magnetic field coil.

* * * * *